(12) United States Patent
Kleppe et al.

(10) Patent No.: US 11,454,798 B2
(45) Date of Patent: Sep. 27, 2022

(54) 3D MICROSCOPY

(71) Applicant: Carl Zeiss Microscopy GmbH, Jena (DE)

(72) Inventors: Ingo Kleppe, Jena (DE); Matthias Wald, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 146 days.

(21) Appl. No.: 16/492,902

(22) PCT Filed: Mar. 1, 2018

(86) PCT No.: PCT/EP2018/055053
§ 371 (c)(1),
(2) Date: Sep. 10, 2019

(87) PCT Pub. No.: WO2018/162319
PCT Pub. Date: Sep. 13, 2018

(65) Prior Publication Data
US 2021/0141205 A1 May 13, 2021

(30) Foreign Application Priority Data

Mar. 10, 2017 (DE) .......................... 102017105103.1

(51) Int. Cl.
*G02B 21/36* (2006.01)
*G06T 7/557* (2017.01)
*H04N 13/20* (2018.01)

(52) U.S. Cl.
CPC ............ *G02B 21/361* (2013.01); *G06T 7/557* (2017.01); *H04N 13/20* (2018.05); *G06T 2207/10056* (2013.01)

(58) Field of Classification Search
CPC ................ G02B 21/361; G02B 21/367; G02B 27/0075; G02B 3/0056; H04N 13/20; G06T 7/557; G06T 2207/10056
(Continued)

(56) References Cited

U.S. PATENT DOCUMENTS 3,013,467 A 12/1961 Minsky
7,433,042 B1 10/2008 Cavanaugh et al.
(Continued)

FOREIGN PATENT DOCUMENTS

CN 104516097 A 4/2015
CN 105259664 A 1/2016
(Continued)

OTHER PUBLICATIONS

Giro, E., et al., "BIGRE: a new double microlens array for the integral field spectrograph of SPHERE," *Proc of SPIE*, vol. 7014, 12 pgs. (2008).
(Continued)

*Primary Examiner* — Christopher S Kelley
*Assistant Examiner* — Ana Picon-Feliciano
(74) *Attorney, Agent, or Firm* — Christensen, Fonder, Dardi & Herbert PLLC (57) ABSTRACT

A microscopy method for three-dimensionally imaging an object, including imaging the object along a beam path into a first image on a first image plane. A first microlens array is arranged on the first image plane, and a second microlens array with the same pitch is arranged downstream of the first array. The two arrays laterally segment the first image and image same into a second image in which the segments are spaced apart and separated by gaps. On a pupil plane downstream of the microlens array, a provided phase mask generates a spot for each segment of the second image according to a pixel diffusion function. A detector detects the
(Continued)

shape and structure of the spot, and a controller ascertains a lateral intensity distribution and depth specification from the shape and/or structure of the spot for each segment and generates a depth-resolved image of the object therefrom.

18 Claims, 4 Drawing Sheets

(58) Field of Classification Search
USPC .......................................................... 348/46
See application file for complete search history.

(56) References Cited

U.S. PATENT DOCUMENTS

| | | | |
|---|---|---|---|
| 2006/0256436 A1* | 11/2006 | Javidi .................. | H04N 13/232 359/466 |
| 2012/0287447 A1 | 11/2012 | Zomet | |
| 2013/0063825 A1 | 3/2013 | Spiro | |
| 2013/0300833 A1 | 11/2013 | Soeller et al. | |
| 2014/0176678 A1 | 6/2014 | Novikau et al. | |
| 2014/0263963 A1 | 9/2014 | Broxton et al. | |
| 2015/0085357 A1 | 3/2015 | Merz et al. | |
| 2016/0062100 A1 | 3/2016 | Cohen et al. | |
| 2016/0091706 A1 | 3/2016 | Raghunathan | |
| 2016/0238827 A1* | 8/2016 | Shroff ................ | G02B 21/0036 |
| 2016/0313231 A1 | 10/2016 | Pruneri et al. | |
| 2016/0334613 A1 | 11/2016 | Ishiwata | |
| 2017/0068080 A1 | 3/2017 | Anhut et al. | |
| 2019/0107704 A1* | 4/2019 | Miyazaki ............... | G02B 21/02 |
| 2019/0179128 A1* | 6/2019 | Shroff .................... | G02B 27/58 |

FOREIGN PATENT DOCUMENTS

| | | |
|---|---|---|
| DE | 10 2012 224 306 A1 | 6/2014 |
| DE | 10 2014 102 215 A1 | 8/2015 |
| WO | WO 2004/099835 A1 | 11/2004 |
| WO | WO 2011/086558 A1 | 7/2011 |
| WO | WO 2012/039636 A2 | 3/2012 |

OTHER PUBLICATIONS

Integral Field Spectroscopy Wiki (http://ifs.wikidot.com/what-is-ifs), 4 pgs.
Markus, "Light Field Microscope: New Imaging System Allows Real-Time 3D Microscopy," http://lightfield-forum.com/2014/05/light-field-microscope-new-imaging-system allows-real-time-3d-microscopy/#more-8511); 5 pgs.
Prevedel, Robert, et al., "Simultaneous whole-animal 3D-imaging of neuronal activity using light-field microscopy," *Nat Methods*, vol. 11, No. 7, 13 pgs. (Jul. 2014).
Stanford Light Field Microscope Project, http://graphics.standford.edu/projects/lfmicroscope/), 3 pgs. (updated Dec. 7, 2015).
Wikipedia—Light Field, https://en.wikipedia.org/wiki/Light_field), 7 pgs., edited Jul. 9, 2019.
Engelmann, Ralf, et al., "Airyscanning, A Novel Approach to Confocal Imaging," *Technology Note from Zeiss*, 5 pgs. (Aug. 2014).
Zeiss, "Introduction to Spinning Disk Confocal Microscopy," (http://zeiss-campus.magnet.fsu.edu/articles/spinningdisk/introduction.html); 15 pgs.
Zeiss, "Light Sheet Microscopy," (http://zeiss-campus.magnet.fsu.edu/referencelibrary/lightsheet.html) 2 pgs.
Zeiss, "Structured Illumination: ZEIS ApoTome," (http://zeiss-campus.magnet.fsu.edu/tutorials/opticalsectioning/apotome/indexflash.html), 1 pg.
Zeiss, "VivaTome Optical Train," (http://zeiss-campus.magnet.fsu.edu/tutorials/opticalsectioning/vivatomeopticaltrain/indexflash.html.), 2 pgs.
Abrahamsson, Sara, et al., "Fast and sensitive multi-color 3D imaging using aberration-corrected multi-focus microscopy," *Nat Methods*, vol. 10, No. 1, 11 pgs. (Jan. 2013).
Bouchard, Matthew B., "Swept confocally-aligned planar excitation (SCAPE) microscopy for high speed volumetric imaging of behaving organisms," *Nat Photonics*, vol. 9, No. 2, 16 pgs. (Feb. 2015).
De Luca, Giulia M.R., et al., "Re-scan confocal microscopy: scanning twice for better resolution," *Biomedical Optics Express*, vol. 4, No. 11, pp. 2644-2656 (Nov. 1, 2013).
Geissbuehler, Stefan, "Live-cell multiplane three-dimensional super-resolution optical fluctuation imaging," *Nature Communications*, 7 pgs. (Aug. 2014).
Hagen, Nathan, et al., "Snapshot advantage: a review of the light collection improvement for parallel high-dimension measurement systems," *Optical Engineering*, vol. 51, No. 11, 8 pgs. (Nov. 2012).
Kester, Robert T., "Development of image mappers for hyperspectral biomedical imaging applications," *Applied Optics*, vol. 49, No. 10, 34 pgs. (Apr. 1, 2010).
Broxton, Michael, et al., "Wave optics theory and 3-D deconvolution for the light field microscope," *Optic Express*, vol. 21, No. 21, pp. 25418-25439 (Oct. 21, 2013).
Hagen, Nathan, et al., "Review of snapshot spectral imaging technologies," *Optical Engineering*, vol. 52, No. 9, 24 pgs. (Sep. 2013).
Berlich, René, et al., "Single shot three-dimensional imaging using an engineered point spread function," *Optics Express*, vol. 24, No. 6, pp. 5946-5960 (Mar. 21, 2016).
Cohen, Noy, et al., "Enhancing the performance of the light field microscope using wavefront coding," *Optics Express*, vol. 22, No. 20, pp. 24817-24839 (Oct. 6, 2014).

* cited by examiner

3D MICROSCOPY

PRIORITY CLAIM

The present application is a National Phase entry of PCT Application No. PCT/EP2018/055053, filed Mar. 1, 2018, which claims priority from German Patent Application 10 2017 105 103.1, filed Mar. 10, 2017, the disclosures of which are hereby incorporated by reference herein in their entirety.

FIELD OF THE INVENTION

The invention relates to a method for three-dimensional imaging of an object, wherein the object is imaged along an imaging beam path into a first image lying in a first image plane, a first microlens array is arranged in the first image plane, an intensity distribution is captured downstream of the first microlens array and image data are obtained therefrom and a depth-resolved image of the object is produced from the latter.

The invention further relates to a camera for three-dimensional object imaging using an imaging device that images the object into a first image lying in a first image plane, the camera comprising a first microlens array for arrangement in the first image plane of the microscope or in a further image plane derived therefrom by means of an intermediate optical unit, a detector that produces image data and that is disposed downstream of the first microlens array, and a control device for producing an electronic, depth-resolved image of the object from the image data.

BACKGROUND OF THE INVENTION

The prior art has disclosed various approaches for obtaining depth resolution by means of microscopy and hence developing 3D microscopy. To this end, the so-called light field microscopy is proposed by the publication M. Broxton et al., Optics Express, vol. 21, no. 21, pp. 25418-25439. In this microscopy method, a microlens array for three-dimensional imaging of an object is arranged in an image plane of the microscope or in a further image plane derived therefrom by means of an intermediate optical unit, said microlens array guiding the radiation onto a detector. Here, the design is chosen in such a way that the image fields of the individual lenses of the microlens array completely fill the plane in which the detector lies. Appropriate image processing of the light field captured by the detector supplies an image with a greater depth of field and facilitates sections from different depth positions of the object. This realizes 3D microscopy. However, the light field microscopy reduces the lateral resolution to the diameter of a single lens element of the microlens array situated in the image plane. The publication N. Cohen, et al., Optics Express, vol. 22, no. 20, pp. 24817-24839 improves the lateral resolution of the light field microscopy by virtue of a first phase mask being provided in the back-side focal plane of the objective lens and a second phase mask being provided directly on the microlens array, and by virtue of the computational evaluation of the image data being adapted to this change.

U.S. Pat. No. 7,433,042 B1 describes the use of a microlens array that is employed as a tube lens of a microscope and that has a color-filtering mask disposed immediately downstream thereof, said mask providing a plurality of color filter regions for each lens of the microlens array. This allows color information to be obtained from the image obtained by microscopy.

The publication R. Berlich, et al., Optics Express, vol. 24, no. 6, pp. 5946-5960 considers the three-dimensional resolution of an object by way of manipulation of the point spread function.

The publication N. Hagen and M. Kudenov, Optical Engineering, vol. 52, no. 9, September 2013, pp. 090901-1-090901-23 explains various options of extracting color information from a single microscopy recording.

Further, depth-resolving methods that do not operate simultaneously, i.e., require a multiplicity of recordings, are known. An example to this end is the so-called light sheet microscopy or the laser scanning microscopy with confocal scanning of the sample. On account of the fact that said methods require a plurality of recordings they have a significant disadvantage in terms of speed. By contrast, the light field methods mentioned above suffer in terms of the lateral resolution as a result of reducing the effective numerical aperture in the pupil.

SUMMARY OF THE INVENTION

The invention is therefore based on the object of developing a three-dimensional microscopy method in such a way that three-dimensional information with the smallest possible loss of lateral resolution and simplest possible optical structure can be obtained from a single image of the sample.

The invention is defined in the claims where are related to a microscopy method, and relate to a camera for three-dimensional object imaging using a microscope. The invention further comprises a microscope having such a camera.

In the microscopy method, an object is imaged along an imaging beam path into a first image plane for the purposes of the three-dimensional imaging of the object. A first microlens array is arranged in the first image plane. An intensity distribution is captured downstream of the first microlens array. Image data are obtained therefrom, a depth-resolved image of the object being produced by means of said image data. In this respect, the microscopy method corresponds to the light field microscopy. However, a second microlens array is now additionally disposed downstream of the first microlens array. Both microlens arrays have the same pitch. Together, they produce a laterally segmented version of the first image in a second image plane. This second image has a plurality of segments. Each segment is spaced apart from the adjacent segments. Consequently, the two microlens arrays create segments that are spaced apart from one another by gaps. However, this segmented image is not present in this way since the space created by the gaps is exploited for a phase manipulation that produces a spot for each segment in the second image, said spot being structured by the phase manipulation in accordance with a point spread function that depends on the depth position in the object. The phase manipulation is designed in such a way that the form and/or structure of the spot encodes a depth position of the associated point in the object. The spots produced thus represent an enlargement in relation to the original segments rendered possible by the created gaps. The spots cover the gaps at least in part. The intensity distribution is captured in the second image plane, the form and/or structure of the spot being resolved for each segment. The lateral intensity distribution of the original segment (i.e., prior to the phase manipulation) and, additionally, a specification about the depth structure at the respective object point are ascertained for each segment from the form and/or structure of the spot within the scope of image processing. The depth-resolved image of the object is produced therefrom.

The two microlens arrays segment the first image laterally and ensure that the segments in the second image are separated by gaps. The gaps are exploited for the subsequent phase manipulation that expands the segments into spots that are larger than the original segments on account of the point spread function that is manipulated in a depth-dependent fashion. The form and/or structure of the spots depends on the depth position of back-scattering or radiation-emitting (e.g., fluorescent) elements of the object in the respective segment. As a result of the gaps, the expanded spots remain sufficiently spaced apart from one another and can also be evaluated both in respect of the lateral intensity distribution in respective spots and in respect of a depth structure within the scope of a subsequent evaluation of the intensity distribution that resolves the form and/or structure of the spots. Since, unlike in light field microscopy, the segments continue to carry lateral spatial information, the microscopy method or the camera keeps the lateral spatial information of the first image and does not necessarily restrict said lateral spatial information to the pitch of the first microlens array. Consequently, the lateral resolution is not compromised to that extent to the detriment of the depth resolution, as is the case in light field microscopy.

There are a number of options for arranging the two microlens arrays. In embodiments, the two microlens arrays are embodied in such a way that a telecentric intermediate image is obtained, a pupil plane in which the phase manipulation can be carried out then being generated therefrom by a relay optical unit. The two microlens arrays are then situated at a distance that corresponds to the sum of the focal lengths of the two arrays. A non-telecentric intermediate image plane is produced in other embodiments. It is then possible to dispense with the relay optical unit for producing a further pupil. The phase-manipulating pupil intervention is implemented directly at the second microlens array. The latter is situated in the focal plane of the first microlens array.

So as to simplify the segmentation, it is preferable for the first image to be expanded in relation to the conventional microscope image by way of a post-enlarging optical unit.

The phase manipulation can be designed for the entire cross section of the beam path. Then, a single phase-manipulating element (e.g., a phase mask or spatial light modulator) is placed into the beam path, e.g., the pupil plane. Therefore, the beam path can have a reflective or transmitted embodiment in relation to the element. Alternatively, the phase manipulation can be carried out in such a way that individual phase mask elements are provided for individual segments. This construction lends itself, in particular, to the embodiment with a non-telecentric intermediate image, in which the phase manipulation is embodied at the second microlens array. Then, the second microlens array does not only comprise a multiplicity of mini-lenses, which each have an imaging effect, but phase-manipulating elements, e.g., phase mask elements, are combined with the mini-lenses at the same time.

In order to minimize crosstalk between the images of the individual microlenses, a relationship is preferably observed between the focal length f and pitch (spacing) of the microlenses of the first microlens array, said relationship satisfying the relation $$(f/p) = \alpha/(2NA).$$

Here, p is the spacing of the microlens centers. The area of the beam cross section in relation to the area of the microlens is denoted by a; i.e., it assumes a value of 1 in the case of the complete illumination of the microlens. NA is the numerical aperture in the intermediate image for which the camera is designed.

The camera for three-dimensional object imaging can be used in a conventional wide-field microscope. All that needs to be carried out is placing the microlens array into the image plane of the microscope. Where this is not possible for structural regions, for example because a microscope flange does not offer sufficient access or space, the camera may comprise an intermediate optical unit which moves the first image in the first image plane into a further image plane in which the microlens array then lies. This procedure is known from the aforementioned work by M. Broxton et al.

The retrofittable camera provides an imaging apparatus, e.g., a fundus camera or microscope that has not allowed pronounced three-dimensional object imaging until now, with a corresponding 3D capability.

BRIEF DESCRIPTION OF THE DRAWINGS

Below, the invention will still be explained in more detail by way of example, with reference being made to the drawing. In the drawing.

DETAILED DESCRIPTION

Figure 1:
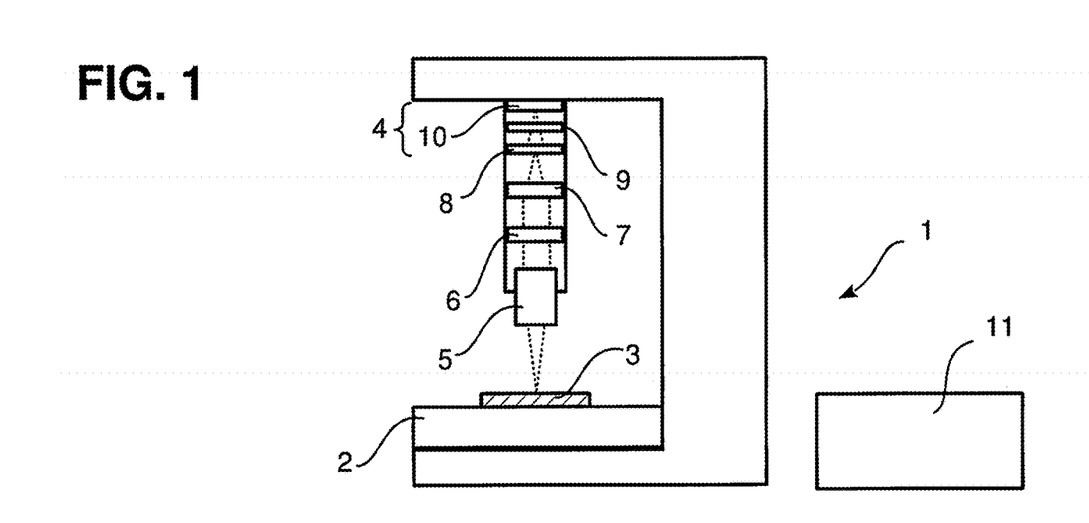
FIG. 1 shows a schematic illustration of a microscope comprising a camera for 3D microscopy.
Figure 2:
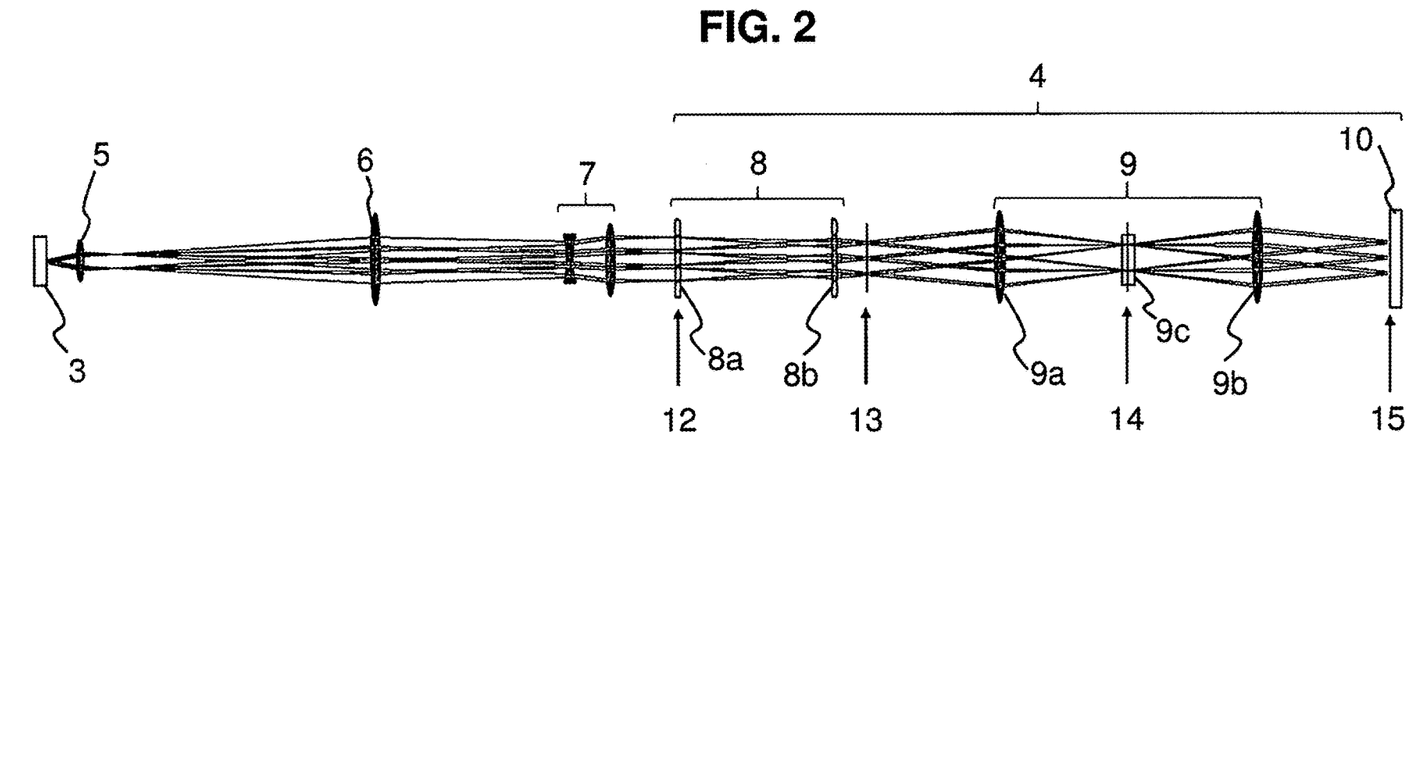
FIG. 2 shows a schematic illustration of the beam path in the microscope with a camera.

FIG. 1 schematically shows a microscope 1 for three-dimensional microscopy. FIG. 2 schematically shows the associated beam path of the microscope 1. In exemplary fashion, the microscope 1 is configured for wide-field microscopy and it comprises a sample stage 2, on which the object 3 to be examined by microscopy is situated. The microscope 1 is a conventional wide-field microscope; however, it has been complemented by a camera whose optical elements are denoted by reference sign 4 in FIGS. 1 and 2. In addition to these optical elements, the camera 4 additionally comprises a controller 11, which may be embodied as an independent controller or which may be realized by a specific function of a controller that is already provided in any case for other purposes in the microscope 1. In particular, the controller 11 can be embodied as a software module for a conventional computer. It receives image data via a line and processes said image data.

The microscope 1 images the object 3 via an objective lens 5 and a tube lens 6, which acts as a conventional field lens. An enlarging optical unit 7, which, however, is optional, is disposed downstream of the tube lens 6 in this embodiment. Objective lens 5 and tube lens 6 produce a wide-field image 12 in an image plane, which is only an intermediate image plane on account of the camera 4 disposed downstream thereof. The image 12 in the intermediate image plane is recorded by a microlens array pair 8 comprising a first microlens array 8a and a second microlens array 8b. The two microlens arrays 8a, 8b have the same pitch. The first microlens array 8a is arranged in the intermediate image plane. Since further intermediate image planes or image planes still follow in the beam path of FIG. 2, the image plane provided by objective lens 5, tube lens 6 and enlarging optical unit 7 is referred to here as the first image plane or first intermediate image plane.

The effect of the enlarging optical unit 7 is that the image in the first intermediate image plane is expanded in relation to the size that would be provided by the objective lens 5 and tube lens 6. This expansion provides no additional image information but simplifies the image information of the subsequent microlens array pair 8.

The microlens array pair 8 subdivides the first image 12 into segments. The type of segmentation will still be explained in more detail below on the basis of FIG. 3. The segmented image 13b is found in a second intermediate image plane and imaged from there into a final image 15 on a detector 10 by means of a phase manipulation device 9. The phase manipulation device 9 comprises a relay optical unit 9a, 9b, which transfers the second intermediate image plane into a final image plane, in which the final image 15 the detector 10 lie, with an interposed pupil plane 14 arising, a phase mask 9c being arranged therein.

Figure 3:
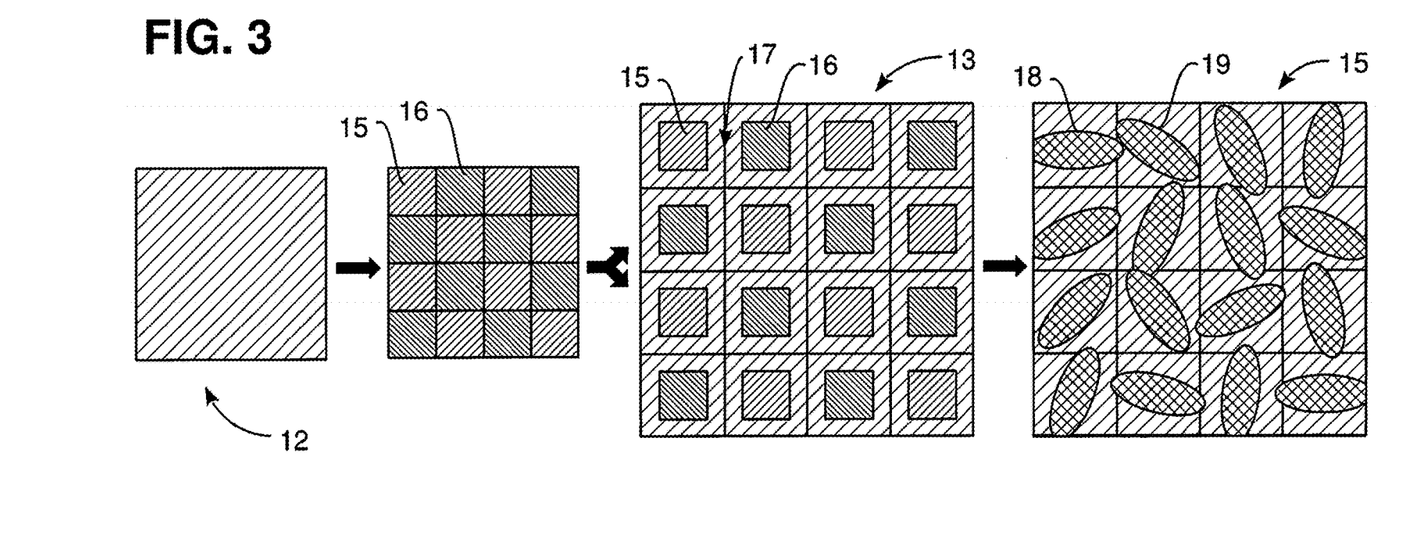
FIG. 3 shows the sequence of various images that arise in the microscope according to FIG. 1 or in the beam path according to FIG. 2, FIGS. 4 and 5 show possible variants for the arrangement of a microlens array pair in the camera of FIGS. 2 and 1.

FIG. 2 shows the sequence of the corresponding image planes. FIG. 3 shows the associated images. The first image 12, which is only a first intermediate image on account of the subsequent optical unit, arises in the first intermediate image plane. The microlens array pair 8 subdivides the first intermediate image 12 into individual segments 15, 16, with the subdivision being predetermined by the pitch of the microlens arrays 8a, 8b. At the same time, the first intermediate image 12 is expanded by the microlens array pair 8 in such a way that the individual segments are spaced apart from the adjacent segments. FIG. 3 shows the segmentation sequence for elucidation purposes. The first image 12 is on the left. The next image is not present in reality and should only indicate the segmenting effect in the first image 12. What follows then is the second intermediate image 13, which is in fact produced by the microlens array pair and in which there now is a gap 17 between the segments 15, 16 that lay seamlessly against one another in the first intermediate image 12. This applies to all segments into which the first intermediate image 12 has been subdivided.

The gaps 17 provide space for the subsequent phase manipulation by means of the phase manipulation device 9. It records the second intermediate image 13 via its relay optical unit 9a, 9b and images said second intermediate image into the final image 15 on the detector 10, with a phase manipulation being carried out by a phase mask 9b in an interposed pupil plane 14. The phase manipulation by the phase mask 9b subjects each segment 15, 16 to a point spread function that depends on the depth position in the object 3. Consequently, a corresponding spot 18, 19 arises from each segment 15, 16. It is expanded in relation to the original segment 15, 16; i.e., it occupies a larger area in the final image 15. However, there is space for expanding the segments 15, 16 into the spots 18, 19 on account of the gaps 17 that were created in the second intermediate image 13 by the microlens array pair 8.

In order to minimize crosstalk between the images of the individual microlenses, a relationship is preferably observed between the focal length f and the spacing of the centers of the microlenses (referred to as pitch below) of the first microlens array, said relationship satisfying the relation $$(f/p) = \alpha/(2\ NA) \tag{1}$$

Here, p is the spacing of the microlens centers. The area of the beam cross section in relation to the area of the microlens is denoted by $\alpha$; i.e., it assumes a value of 1 in the case of the complete illumination of the microlens. NA is the numerical aperture in the intermediate image 12 for which the camera 4 is designed.

This relationship is based on the following discovery which may be ascribed to the inventors: The condition that there should be, where possible, no crosstalk of the imaging between the microlenses can be expressed by the illumination parameter a by way of the requirement that $\alpha<1$. If a relative variable k is defined, the latter describing the size of the image field of an individual microlens relative to the size of an airy disk (k:=p/airy diameter), a state in which no phase information for the subsequent beam shaping by diffraction and hence distribution over further microlenses is lost can be prescribed by way of a minimum size for k. By way of example, if k were significantly less than 1 airy, the phase information for beam shaping in a channel would no longer be completely present. What follows therefrom is that k must be at least greater than 1 airy, but better even greater than 2 airy in order to transport sufficient z-information in each microlens image. Then, the image information can be encodable particularly well. An optional restriction for the nature of the microlens array, for its ratio of microlens spacing (p) to focal length (f), emerges from the two conditions:

$$\frac{f}{p^2} = \frac{\alpha}{2.44 \lambda k}. \tag{2}$$

Since the size of an airy disk is given by its diameter $d=1.22\lambda/NA$ and since $k=p/d$ applies, the surprisingly clear, aforementioned equation (1) arises from equation (2).

Likewise, a focal length ratio of the microlens arrays that obtains a sufficient reduction in size is preferred so as to create sufficient space for the expansion of the light beam by the z-coding per microlens. This clearly depends on the intended number of captured z-planes.

FIG. 3 schematically showed an expansion to elongate spots 18, 19, the rotational position of which depends on the depth in the object 3 from which the image information for the segments 15, 16 originated. The final image 15 is captured by the detector 10, the spatial resolution of which is designed in such a way that the form and/or structure of the spots 18, 19 is resolved. Then, from the image data of the detector 10, the control device 11 ascertains both information about the depth position (symbolized in exemplary fashion in FIG. 3 by the rotational position of the elongate spots 18, 19) and information about the lateral intensity distribution which was present in the original segment 15, 16. This ascertains a three dimensionally resolved image of the object 3, i.e., a depth specification, without there being a reduction in the lateral resolution to the pitch of the microlens array 8a, 8b.

Reference is made to the fact that, in FIG. 3, the segments 15, 16 are only plotted as rectangular in an exemplary fashion. This serves for elucidation purposes. Other segment forms are also possible, e.g., circular segments. The same applies to the spots 18, 19, which are only plotted as elongate spots for elucidation purposes.

The prior art has disclosed various phase masks that produce a depth-dependent point spread function. Examples of such phase masks are found in WO 2012/039636 and in DE 102012224306 A1. Although the two publications explain the phase masks in a different context, specifically in combination with so-called localization microscopy (e.g., PALM methods), the phase manipulation explained therein is equally suitable for producing the depth-dependent point spread function by the camera 4. In this view, the disclosure of these documents is here incorporated in the entirety thereof.

Figure 4:
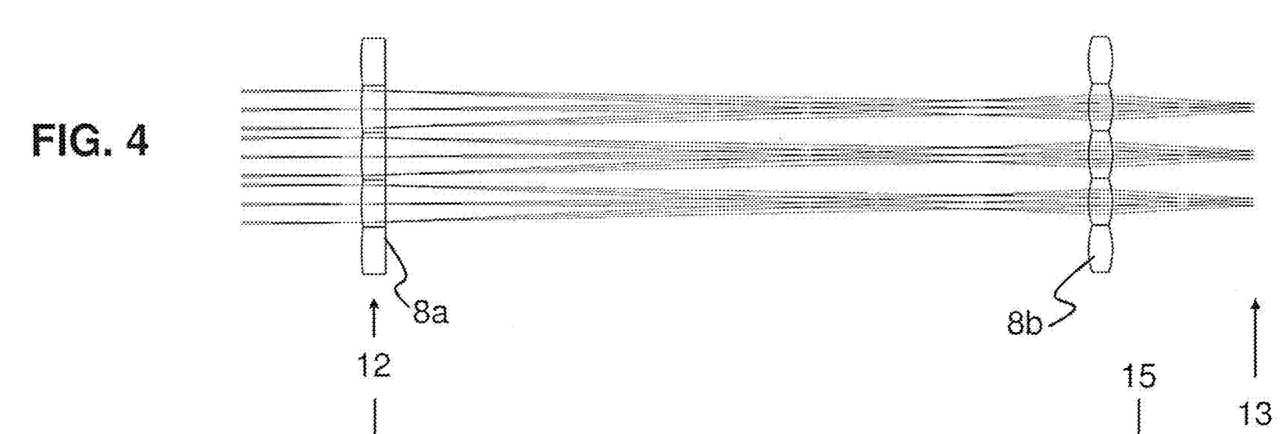
Figure 5:
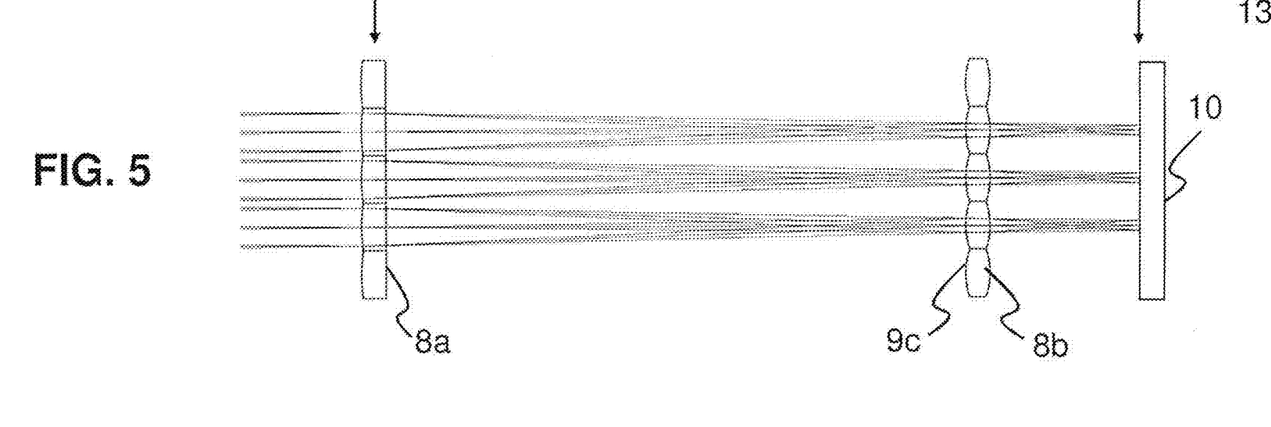

In the beam path of FIG. 2, the microlens array pair 8 produces the second intermediate image 13 and the phase manipulation device 9 converts the latter into the final image 15 while producing the interposed pupil plane 14. To this end, as shown in FIG. 4, the microlens array pair 8 can be configured in a telecentric arrangement; i.e., the first microlens array 8a and the second microlens array 8b are spaced apart by the sum of their focal lengths. However, a configuration without a telecentric intermediate image is also possible. This embodiment is elucidated in FIG. 5. Then, the second microlens array 8b is at a distance corresponding to the focal length of the first microlens array 8a from the first microlens array 8a, which is situated in the first intermediate image plane of the first intermediate image 12. Then, it is possible to dispense with the relay optical unit 9a, 9b and the phase manipulation is carried out directly at the second microlens array 9b. FIG. 5 plots, in exemplary fashion, a phase-manipulating structure in the form of a phase mask 9c that is applied to the front side of the microlens array 8b. Naturally, the corresponding structure can also be arranged within the second microlens array 8b or on the back side thereof. Equally, it is possible to dispose a corresponding phase mask directly upstream or downstream of the second microlens array 8b. The advantage of the non-telecentric design lies, firstly, in its compactness since the final image 15 arises relatively shortly after the second microlens array 8b and the detector 10 is arranged there. Secondly, there is a very low channel crosstalk between adjacent microlenses arrays. It is also possible to dispense with the adjustment outlay for the relay optical unit 9a, 9b.

Various variants for the phase mask come into question for both variants, i.e., for FIG. 4 with a downstream relay optical unit 9a, 9b and FIG. 5 without this relay optical unit. A distinction should be made here between two fundamentally different approaches. The phase mask may carry out a uniform phase manipulation over the entire cross section of the beam path in FIG. 4. As an alternative thereto, it is possible to provide for an array of individual phase mask elements which individually modify the point spread function in depth-dependent fashion for individual segments. This is optional for the structure in FIG. 4; this effect is obtained automatically in FIG. 5.

The processing of the image data performed by the controller 11 may resort to the algorithms of light-field microscopy, which was specified at the outset. How the z-information is encoded in the intensity distribution by way of the detector 10 ultimately depends on the chosen phase mask. Therefore, a general description of the procedure for processing the image data is provided below, independently of the specific phase mask.

In embodiments, the images are deconvolved on the basis of the point spread function (PSF), which is assigned to the individual pixels of the detector 10. This is analogous to the method as described by Broxton et al. (citation provided above)—with the difference that the PSF now is individual to the pixel. In embodiments, it is known in advance and was ascertained from the distribution of the PSF over the second microlens array 8b.

As a rule, the assumption suffices that the distribution of the PSF is the same for all microlenses of the second microlens array 8b, and so knowing the variation of the PSF for an individual microlens suffices in embodiments for the purposes of ascertaining the PSF per pixel. Since a pixel group is assigned to each microlens, the PSF per pixel arises for each pixel of the detector 10 in a simple manner from the variation of the PSF per microlens.

The PSF for an individual microlens is known in advance in embodiments, e.g., from an experimental determination, for example by measuring beads as sample bodies. A phase mask that is analytically describable is used in other embodiments. Then, there is an analytic derivation of the PSF in a manner similar to Broxton et al., p. 25427, equation 5—however, the second microlens array 8b is now also taken into account. The PSF for a microlens can moreover be calculated numerically using a wave-optical model. In further embodiments, it is known in advance from a wave-optical simulation of the entire setup (including the phase mask). In embodiments, the PSF of a microlens can be discretized in a manner analogous to light-field microscopy (cf., Broxton et al., section 3.2) and noise can be included in the modeling.

The deconvolution and hence image construction is implemented in embodiments using the PSF per pixel in a manner analogous to Broxton et al. using a Lucy-Richardson formalism (cf., Broxton et al., section 3.4). By contrast, conventional linear deconvolution methods cannot be considered on account of the spatial dependence of the PSF.

Figure 6:
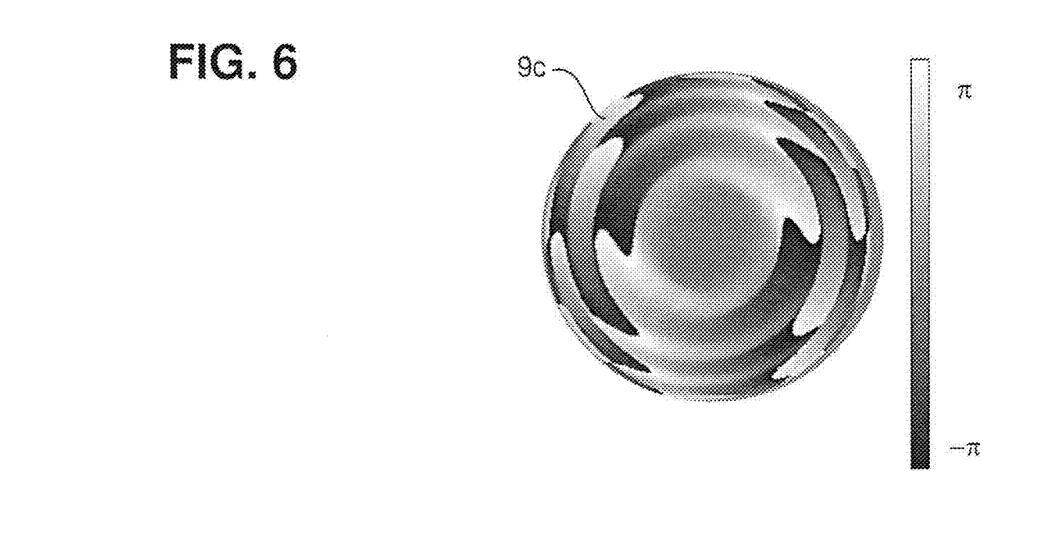
FIG. 6 shows an illustration of a phase mask.
Figure 7:
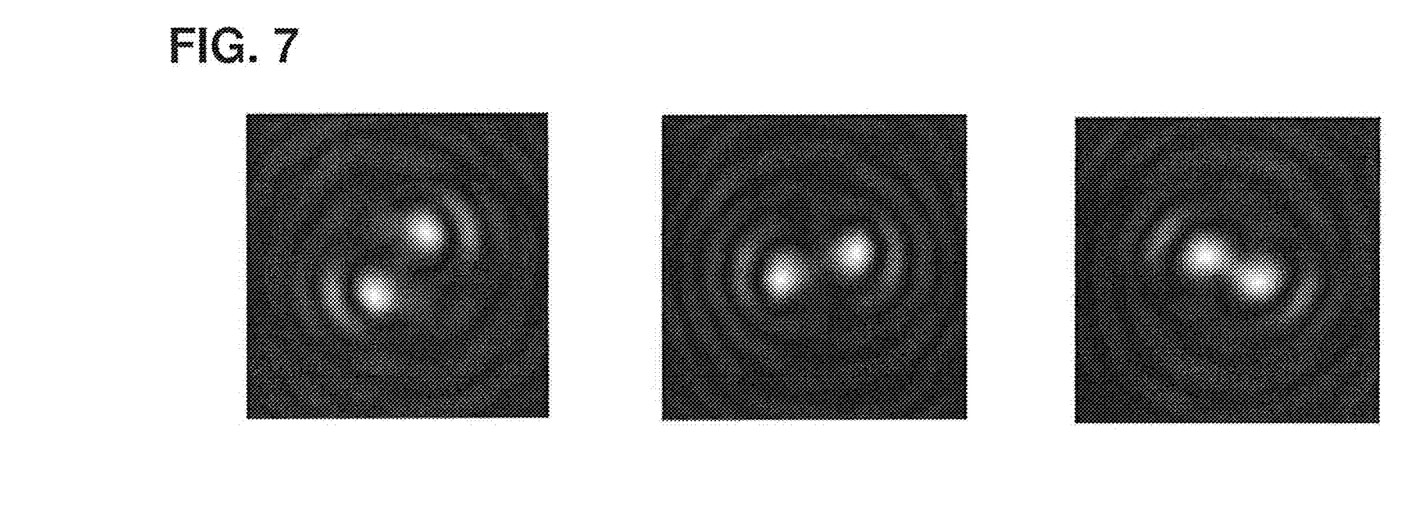
FIG. 7 shows illustrations of the effect of this phase mask.

Alternatively, the individual pixels of the detector can be assigned to planes in the object 3 without undertaking a deconvolution in a simplified embodiment. FIG. 6 shows a plan view of a phase mask 9c, as may be used, for example, in the setup of FIG. 2. It brings about a spiral point spread function. The image of a point in the focal plane is subdivided into two spots lying next to one another by way of this phase mask 9c. These spots rotate about a common center as a function of the distance from the focal plane. Here, there is also a slight change in the spacing of the spots on account of the spiral shape of the PSF. These conditions are shown in FIG. 7 which, in exemplary fashion, shows the image of a point that lies in the focal plane (central illustration in FIG. 7), that is arranged slightly below the focal plane (left-hand illustration in FIG. 7) or that is arranged slightly above the focal plane (right-hand illustration in FIG. 7).

The invention claimed is:
1. A method for three-dimensional imaging of an object comprising:
using a microscope comprising a microscope objective lens and a tube lens,
optically imaging the object along an imaging beam path by using the microscope objective lens and the tube lens into a first image lying in a first image plane,
arranging a first microlens array in the first image plane,
disposing a second microlens array having a same pitch as the first microlens array downstream of the first microlens array and upstream of a detector, wherein the first microlens array transmits radiation from the object to the second microlens array and the second microlens array transmits the radiation to the detector,
laterally segmenting the first image into segments via the first and second microlens array and imaging the segments into a second image in which the segments are spaced apart from one another and separated by gaps,
conducting a phase manipulation downstream of the first microlens array, said phase manipulation producing a spot in the second image plane for each segment according to a point spread function, a form and/or structure of said spot encoding the depth position in the object and covering the gaps in the second image, using the detector for capturing the intensity distribution for the second image, the form and/or structure of the spots being resolved, and obtaining image data therefrom, and ascertaining a lateral intensity distribution and a depth specification for each of the segments from the form and/or structure of the spots and producing a depth-resolved image of the object therefrom, wherein the second microlens array is arranged at a distance from the first microlens array that corresponds to the focal length of the first microlens array, and a phase manipulation element is combined with the second microlens array.

2. The method as claimed in claim 1, wherein the first image is additionally expanded by a post-enlarging optical unit.

3. The method as claimed in claim 1, wherein the phase manipulation is carried out using a phase mask that acts on all segments or using a phase mask array that comprises individual phase mask elements for individual segments.

4. The method as claimed in claim 1, wherein a relationship between the focal length f and the distance p of the centers of the microlenses of the second microlens array satisfies the relation $$(f/p) = \alpha/(2NA),$$

where $\alpha$ is a ratio between a beam cross-sectional area at each microlens of the second microlens array and an area of the microlens, and NA is a numerical aperture in the first image.

5. A microscope for three-dimensional object imaging using an imaging device that, the microscope comprising:
a microscope objective lens and a tube lens imaging the object into a first image lying in a first image plane,
a first microlens array for arrangement in the first image plane of the microscope or in a further image plane derived therefrom by an intermediate optical unit,
a second microlens array having a same pitch as the first microlens array arranged downstream of the first microlens array and upstream of a detector,
    wherein the first microlens array transmits radiation from the object to the second microlens array and the second microlens array transmits the radiation to the detector, and
    wherein the first and second microlens arrays are configured to segment the first image laterally into segments and to image these into a second image in which the segments are spaced apart from one another and separated by gaps, and
a phase manipulation device that is disposed downstream of the first microlens array, said phase manipulation device producing a spot in the second image plane for each segment according to a point spread function, a form and/or structure of said spot encoding the depth position in the object and covering the gaps in the second image,
wherein the detector lies in the second image plane and is configured to capture the form and/or structure of the spots and to produce image data,
wherein the microscope further comprises a control device for producing a depth-resolved image of the object from the image data, the control device ascertaining a lateral intensity distribution and a depth position specification for each segment from the form and/or structure of the spot and producing the depth-resolved image of the object therefrom, and
wherein the second microlens array is arranged at a distance from the first microlens array that corresponds to the focal length of the first microlens array, and the phase manipulation device is embodied as a phase mask that is combined with the second microlens array or arranged there.

6. The microscope as claimed in claim 5, wherein the phase manipulation element is a phase mask that acts on all segments or a phase mask array that comprises individual phase mask elements for individual segments.

7. The microscope as claimed in claim 5, wherein there is a relationship between the focal length f and the distance p of the centers of the microlenses of the second microlens array, said relationship satisfying the relation:

$$(f/p) = \alpha/(2NA),$$

where $\alpha$ is a ratio between a beam cross-sectional area at each microlens of the second microlens array and an area of the microlens, and NA is a numerical aperture in the first image plane.

8. The microscope as claimed in claim 5, further comprising a tube lens disposed downstream of the microscope objective lens, and a post-enlarging optical unit that expands the first image.

9. A method for three-dimensional imaging of an object comprising:
using a microscope comprising a microscope objective lens and a tube lens,
optically imaging the object along an imaging beam path by using the microscope objective lens and the tube lens into a first image lying in a first image plane,
arranging a first microlens array in the first image plane,
disposing a second microlens array having a same pitch as the first microlens array downstream of the first microlens array and upstream of a detector, wherein the first microlens array transmits radiation from the object to the second microlens array and the second microlens array transmits the radiation to the detector,
laterally segmenting the first image into segments via the first and second microlens array and imaging the segments into a second image in which the segments are spaced apart from one another and separated by gaps,
conducting a phase manipulation downstream of the first microlens array, said phase manipulation producing a spot in the second image plane for each segment according to a point spread function, a form and/or structure of said spot encoding the depth position in the object and covering the gaps in the second image,
using the detector for capturing the intensity distribution for the second image, the form and/or structure of the spots being resolved, and obtaining image data therefrom, and
ascertaining a lateral intensity distribution and a depth specification for each of the segments from the form and/or structure of the spots and producing a depth-resolved image of the object therefrom,
wherein the second microlens array is arranged at a distance from the first microlens array that corresponds to a sum of focal lengths of the first and second microlens arrays.

10. A microscope for three-dimensional object imaging using an imaging device that, the microscope comprising:
a microscope objective lens and a tube lens imaging the object into a first image lying in a first image plane,
a first microlens array for arrangement in the first image plane of the microscope or in a further image plane derived therefrom by an intermediate optical unit, a second microlens array having a same pitch as the first microlens array arranged downstream of the first microlens array and upstream of a detector, wherein the first microlens array transmits radiation from the object to the second microlens array and the second microlens array transmits the radiation to the detector, and wherein the first and second microlens arrays are configured to segment the first image laterally into segments and to image these into a second image in which the segments are spaced apart from one another and separated by gaps, and a phase manipulation device that is disposed downstream of the first microlens array, said phase manipulation device producing a spot in the second image plane for each segment according to a point spread function, a form and/or structure of said spot encoding the depth position in the object and covering the gaps in the second image, wherein the detector lies in the second image plane and is configured to capture the form and/or structure of the spots and to produce image data, wherein the microscope further comprises a control device for producing a depth-resolved image of the object from the image data, the control device ascertaining a lateral intensity distribution and a depth position specification for each segment from the form and/or structure of the spot and producing the depth-resolved image of the object therefrom, and wherein the second microlens array is arranged at a distance from the first microlens array that corresponds to a sum of the focal lengths of the first and second microlens arrays.

11. The method as claimed in claim 9, wherein the first image is additionally expanded by a post-enlarging optical unit.

12. The method as claimed in claim 9, wherein the second microlens array is followed by a relay optical unit, the relay optical unit producing a pupil plane in which the phase manipulation is carried out.

13. The method as claimed in claim 9, wherein the phase manipulation is carried out using a phase mask that acts on all segments or using a phase mask array that comprises individual phase mask elements for individual segments.

14. The method as claimed in claim 9, wherein a relationship between the focal length f and the distance p of the centers of the microlenses of the second microlens array satisfies the relation:

$$(f/p) = \alpha/(2NA),$$

where $\alpha$ is a ratio between a beam cross-sectional area at each microlens of the second microlens array and an area of the microlens, and NA is a numerical aperture in the first image.

15. The microscope of claim 10, wherein the second microlens array is arranged at a distance from the first microlens array that corresponds to a sum of the focal lengths of the two microlens arrays, and the pair of microlens arrays is followed by a relay optical unit, the latter producing a pupil plane in which a phase mask is arranged such that the phase manipulation device is formed by the relay optical unit and the phase mask.

16. The microscope of claim 10, wherein the phase manipulation element is a phase mask that acts on all segments or a phase mask array that comprises individual phase mask elements for individual segments.

17. The microscope of claim 10, wherein there is a relationship between the focal length f and the distance p of the centers of the microlenses of the second microlens array, said relationship satisfying the relation:

$$(f/p) = \alpha/(2NA),$$

where $\alpha$ is a ratio between a beam cross-sectional area at each microlens of the second microlens array and an area of the microlens, and NA is a numerical aperture in the first image plane.

18. The microscope of claim 10, further comprising a tube lens disposed downstream of the microscope objective lens, and a post-enlarging optical unit that expands the first image.

* * * * *

UNITED STATES PATENT AND TRADEMARK OFFICE
CERTIFICATE OF CORRECTION

| | |
|---|---|
| PATENT NO. | : 11,454,798 B2 |
| APPLICATION NO. | : 16/492902 |
| DATED | : September 27, 2022 |
| INVENTOR(S) | : Ingo Kleppe and Matthias Wald |

It is certified that error appears in the above-identified patent and that said Letters Patent is hereby corrected as shown below:

In the Specification

In Column 6, Line 8, delete "parameter a" and insert -- parameter $\alpha$ --, therefor.

Signed and Sealed this
Twentieth Day of December, 2022

Katherine Kelly Vidal
*Director of the United States Patent and Trademark Office*